E. B. RANDOLPH.
Brush-Holder.
No. 226,551.  Patented April 13, 1880.
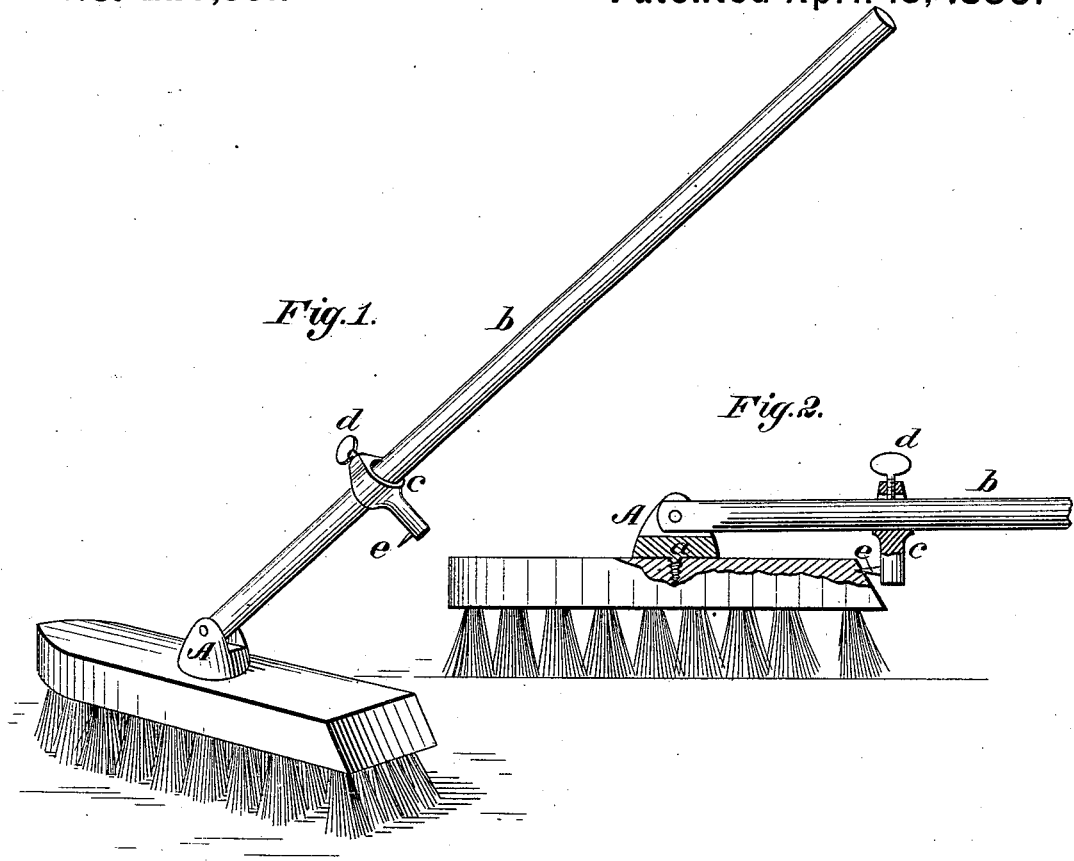
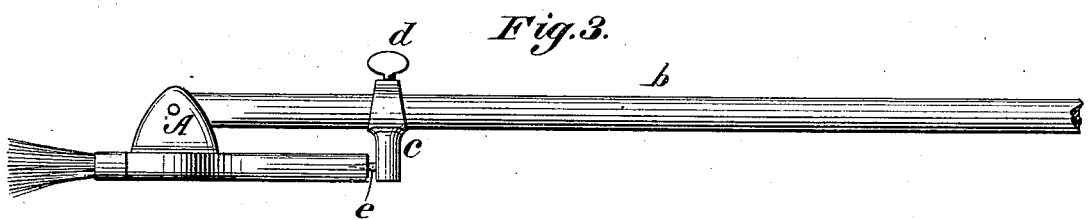
WITNESSES:
Donn J. Twitchell
C. Sedgwick
INVENTOR:
E. B. Randolph
BY Munn & Co
ATTORNEYS.

UNITED STATES PATENT OFFICE.

EUGENE B. RANDOLPH, OF EAST MILLSTONE, NEW JERSEY.

BRUSH-HOLDER.

SPECIFICATION forming part of Letters Patent No. 226,551, dated April 13, 1880.

Application filed January 22, 1880.

*To all whom it may concern:*

Be it known that I, EUGENE B. RANDOLPH, of East Millstone, in the county of Somerset and State of New Jersey, have invented a new and useful Improvement in Brush-Holders, of which the following is a specification.

The object of my invention is to furnish a device for holding scrubbing, whitewash, and other brushes while in use, which holder will permit the convenient and free manipulation of the brush.

My invention is shown in the accompanying drawings, forming part of this specification, and will be described with reference thereto.

In the drawings, Figure 1 is a perspective view of my improved holder as applied to a scrubbing-brush. Fig. 2 is a side view of the same, partially in section, and with the handle rigidly fixed. Fig. 3 is a side view of the holder as applied to a whitewash or other flat brush.

Similar letters of reference indicate corresponding parts.

A is the metal head or socket-piece, formed or provided with screw $a$. $b$ is the handle, pivoted or hinged to head A, and $c$ is the slide fitted on handle $b$, to which it may be clamped by the set-screw $d$, and provided with a prong, $e$, for entering the brush head or handle.

The head is preferably a casting. It is formed with a flat under side to set squarely on the brush-head when the projecting screw $a$ is entered, as shown, which is done by turning the head by means of the handle. The upper side of head A is formed with lugs, that receive between them the end of handle $b$, and a cross-pin holds the handle to the head. This furnishes a knuckle-joint that permits the free movement of the handle in operating the brush.

The slide $c$ is apertured, as shown, to pass freely over the handle, while the screw $d$ may be screwed down upon the handle to clamp the slide $c$ in any desired position upon the handle. The prong $e$ is pointed and projects at right angles, so that it may be entered in the end of the brush-head, as shown in Fig. 2, or into the end of the brush-handle, as shown in Fig. 3. The prong being entered, as shown, and the slide clamped by the screw, the handle is thereby held rigidly to the brush.

This device furnishes a complete and efficient holder for brushes of durable and inexpensive form.

In place of the screw for attaching the head A to the brush-head, other devices, such as clamps, may be used, and the handle may be jointed in any suitable manner.

Having thus described my invention, I claim as new and desire to secure by Letters Patent—

1. In brush-holders, the pronged slide $c$, provided with a clamping-screw, combined with the hinged handle $b$ of the holder, substantially as and for the purposes set forth.

2. In brush-holders, the head A, fitted for attachment to a brush, the handle $b$, hinged to head A, and the pronged slide $c$, fitted for adjustment on the handle, combined together for use in the manner substantially as shown and described.

EUGENE B. RANDOLPH.

Witnesses:
GEO. D. WALKER,
C. SEDGWICK.